United States Patent [19]

Klebe et al.

[11] 4,117,097

[45] Sep. 26, 1978

[54] CONTINUOUS PROCESS FOR THE PRODUCTION OF A COMPACT, COARSE SODIUM PERCARBONATE

[75] Inventors: Hans Klebe, Rheinfelden; Gerd Knippschild, Wehr; Hubert Schuster, Karsau-Beuggen, all of Germany

[73] Assignee: Deutsche Gold-und Silber-Scheideanstalt vormals Roessler, Frankfurt am Main, Germany

[21] Appl. No.: 837,221

[22] Filed: Sep. 27, 1977

[30] Foreign Application Priority Data

Sep. 30, 1976 [DE] Fed. Rep. of Germany ....... 2644148

[51] Int. Cl.² ............................................. C01B 15/10
[52] U.S. Cl. ................................................. 423/415 P
[58] Field of Search ............................ 423/415, 415 P

[56] References Cited

U.S. PATENT DOCUMENTS 2,541,733 2/1951 Young .............................. 423/415 P

FOREIGN PATENT DOCUMENTS 549,841 12/1942 United Kingdom ................. 423/415 P
568,754 4/1945 United Kingdom ................. 423/415 P

*Primary Examiner*—Earl C. Thomas
*Attorney, Agent, or Firm*—Cushman, Darby & Cushman

[57] ABSTRACT

A compact, abrasion resistant sodium percarbonate is produced continuously by reacting sodium carbonate and hydrogen peroxide in the presence of sodium percarbonate inocculant seeds, sodium chloride, an active oxygen stabilizer and sodium hexametaphosphate at 10-20° C, the process comprises feeding into the preliminary inocculant and aqueous hydrogen peroxide solution containing an active oxygen stabilizer and simultaneously either (1) a filtered solution saturated in sodium carbonate and containing 40-100 grams per liter of sodium percarbonate, 0.1-1.0 gram of sodium hexametaphosphate per liter, 100-200 grams of sodium chloride per liter and an active oxygen stabilizer or (2) a mother liquor containing 40-100 grams of sodium percarbonate per liter, 0.1-1.0 gram of sodium hexametaphosphate per liter, 100-200 grams of sodium chloride per liter and an active oxygen stabilizer, with the proviso that when the mother liquor is employed there is also fed into the preliminary inocculant such an amount of calcined soda that no sodium carbonate decahydrate forms as a solid phase in the preliminary inocculant, the amount of hydrogen peroxide employed being approximately equivalent to the amount of dissolved sodium carbonate for reaction, the temperature is maintained constant during the entire process of precipitating sodium percarbonate, the supersaturation initially formed upon addition of the hydrogen peroxide being reduced by the precipitation of the sodium percarbonate, the precipitated sodium per carbonate is separated and dried.

8 Claims, 1 Drawing Figure

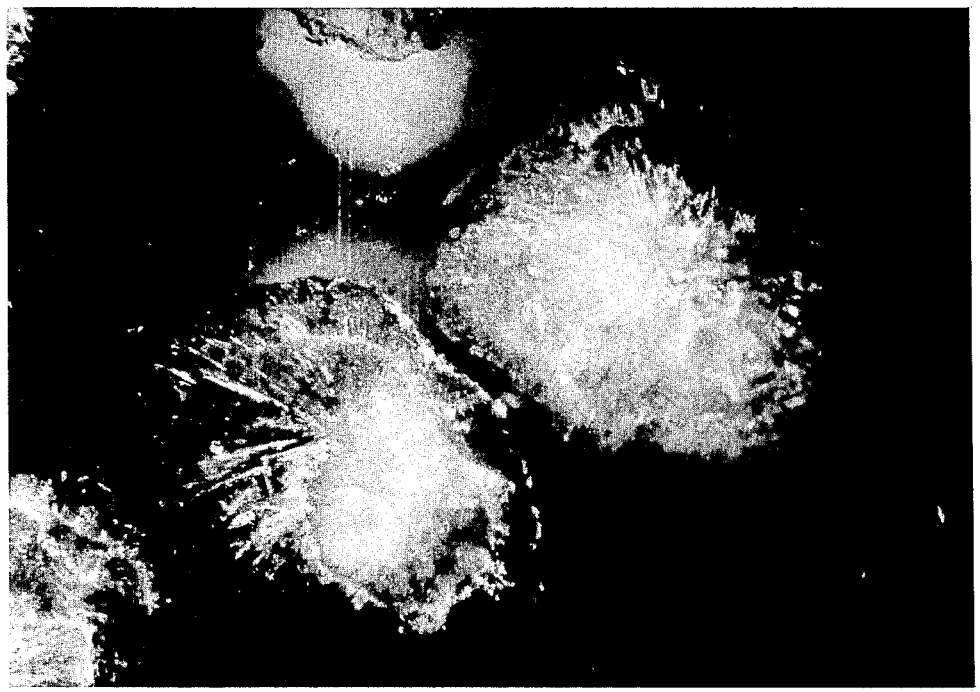

CONTINUOUS PROCESS FOR THE PRODUCTION OF A COMPACT, COARSE SODIUM PERCARBONATE

BACKGROUND OF THE INVENTION

It is known to produce sodium percarbonate by reaction of a soda solution or suspension with aqueous hydrogen peroxide according to the formula $$Na_2CO_3 + 1.5 H_2O_2 \rightarrow Na_2CO_3 \cdot 1.5 H_2O_2 \qquad (I)$$

and thereby reduce the solubility of the percarbonate formed by the addition of inert salts, such as sodium chloride (Swiss Pat. No. 90295).

In British Pat. No. 568,754 there is described the continuous production of sodium percarbonate from hydrogen peroxide and sodium carbonate in which the necessary amounts of hydrogen peroxide and sodium carbonate are only added in small portions to the reaction solution. Simultaneously, the particle structure of the percarbonate is improved by the use of active oxygen stabilizers such as magnesium compounds and is also favorably influenced by the addition of sodium hexametaphosphate.

The disadvantage of the process is, as stated, that the addition of soda and hydrogen peroxide is only carried out in small portions and reaction times are provided between the additions. During the feeding of the materials the temperature increases from 15° to 22° C. and is held at this temperature until the end of the reaction. This process leads to a fine, granular, free flowing percarbonate.

Furthermore, according to German DS. No. 2 328 803 there is obtained an abrasion resistant coarse percarbonate by reaction of a soda solution or suspension which contains 2-8 grams of sodium hexametaphosphate per liter of solution with a hydrogen peroxide solution containing 3-10 grams of magnesium ions per liter of solution, in a given case in the presence of sodium chloride.

Great importance is placed on the exact observance of the amounts of sodium hexametaphosphate and magnesium ions added. Otherwise there are formed fine or non-resistant particles.

The disadvantage of the process which is only carried out discontinuously is that in the reuse of the mother liquor the yield of hydrogen peroxide is greatly reduced at the high soda dissolving temperature of 24° C. because of active oxygen decomposition. This decomposition is further increased in using industrial soda because of the concentrating of impurities in the mother liquor.

Because of this decomposition of active oxygen which continues during the feeding of the hydrogen peroxide the sodium percarbonate crystallization conditions cannot be held constant.

The ratio soda/sodium percarbonate is displaced to favor the soda, which as the most readily soluble component exerts an additional pressure on the sodium percarbonate still present in the solution. The net result is a too quick crystallization, a fine particle product is obtained.

In contrast, the object of the invention is the continuous production of a compact, coarse sodium percarbonate with small active oxygen loss while holding the crystallization conditions as constant as possible with reuse of the mother liquor.

SUMMARY OF THE INVENTION

It has now been found that this object can be attained by reacting sodium carbonate and hydrogen peroxide in the presence of sodium percarbonate seeds, sodium chloride, an active oxygen stabilizer and sodium hexametaphosphate at 10°-20° C. in which process there is fed into the preliminary inocculant an aqueous hydrogen peroxide solution containing the active oxygen stabilizers and simultaneously either (1) a filtered solution which is saturated in sodium carbonate and contains 40-100 grams sodium percarbonate per liter of solution, 0.1-1.0 gram of sodium hexametaphosphate per liter of solution, 100-200 grams of sodium chloride per liter of solution and an active oxygen stabilizer, or (2) a mother liquor which contains 40-100 grams of sodium percarbonate per liter of solution, 0.1-1.0 grams of sodium hexametaphosphate per liter of solution, 100-200 grams of sodium chloride per liter of solution and an active oxygen stabilizer, with the proviso in the case of the mother liquor that simultaneously the amount of calcined soda fed into the preliminary inocculant is such that no sodium carbonate decahydrate is formed as a solid phase in the inocculant and the amount of hydrogen peroxide added is about equivalent to the amount of dissolved sodium carbonate for the reaction while maintaining the same temperature during the entire precipitation process. The supersaturation formed is broken down by precipitation of the sodium percarbonate in a given case in a subsequent reaction step, and the sodium percarbonate obtained is separated according to known process, dried and the resulting mother liquor again returned to the process.

Under the term "calcined soda" there is included both pure soda and also industrial soda.

As the filtered solution which is saturated with sodium carbonate, basic magnesium carbonate and magnesium silicate there are included such solutions which contain per liter 100-200 grams of sodium chloride, 40-100 grams of sodium percarbonate and sodium carbonate decahydrate as a solid phase and in which there is dissolved before or after the addition of the calcined soda sufficient sodium hexametaphosphate per liter of solution that the total amount of sodium hexametaphosphate is 0.1-1.0 gram per liter. The thus produced solution is then decanted and/or filtered and free from the solid phase is reacted with the hydrogen peroxide.

As mother liquor there is designated the solution which remains after separation of the percarbonate and which before its return into the process is brought to the concentrations of sodium hexametaphosphate, and in a given case sodium chloride, stated above in describing the invention.

At the beginning of the process the mother liquor (based on 1 liter of solution) consisting of 40-100 grams of sodium percarbonate, 0.1-1 gram of sodium hexametaphosphate, 100-200 grams of sodium chloride and saturated with basic magnesium carbonate and magnesium silicate is produced synthetically as an aqueous solution.

This synthetic mother liquor serves as the preliminary mixture and is also used for the production of the filtered, sodium carbonate saturated solution.

There is then fed into this preliminary mother liquor hydrogen peroxide simultaneously and continuously either with the filtered, sodium carbonate saturated solution or with mother liquor, whereby in the case of the mother liquor there is also simultaneously led in calcined soda in such amounts that there is not formed any decahydrate as a solid phase in the reaction solution. This is established by a preliminary experiment.

After build up of the percarbonate supersaturation in the reaction solution there occurs during the breakdown of the supersaturation the formation of sodium percarbonate seeds which serve as the preliminary inocculant in the carrying out of the process of the invention.

In order to hold the active oxygen loss as small as possible the process is not carried out at temperatures above 20° C. Preferably the temperature is 14° to 16° C.

It has been found that the degree of supersaturation of the percarbonate formed depends on the amount of sodium hexametaphosphate used and this amount in turn, if a still reducible supersaturation is formed and a compact particle is to be obtained, depends on the precipitation temperature.

Specific precipitation temperatures require in the addition of the solutions saturated with sodium carbonate of the invention the insertion of specific amounts of sodium hexametaphosphate to saturated sodium carbonate solution, thus below 20° C. the amounts given in the description of the invention. Above 20° C. the active oxygen loss begins to become too large. Larger amounts of sodium hexametaphosphate, which can be employed at temperatures above 20° C. cannot be used satisfactorily at 20° C. and below to obtain compact particles.

The reason for this is that a too stable supersaturation of the forming sodium percarbonate is built up by the excessive amount of sodium hexametaphosphate, which supersaturation either does not break down at all or, in the presence of a solid phase of sodium carbonate decahydrate, increasingly is broken down by the solution pressure of the subsequently dissolving soda spontaneously in the form of small seeds. In this manner a compact percarbonate would not be obtained with the smallest possible losses of active oxygen.

To avoid active oxygen losses the entire precipitation process is carried out below 20° C. at about the same temperature, i.e., at ±1° C. in reference to the temperature chosen.

Preferred amounts of sodium hexametaphosphate are 0.2-0.6 gram per liter of filtered addition solution or mother liquor.

The amounts of hydrogen peroxide to be added should, as stated, be about equivalent to the amounts of sodium carbonate present, see formula (I). Under "about equivalent" is meant a ratio of active oxygen to sodium of 0.6 to 0.9:1.

As hydrogen peroxide solutions there are particularly suited 70 weight % aqueous solutions, however, there can be used also commercial higher percentage aqueous hydrogen peroxide solutions, e.g., up to 90%. Also less concentrated solutions than 70 weight % are capable of being added, e.g., as low as 60%. Of course, with lower concentrations of hydrogen peroxide more water is let into the system, through which on the one hand the crystallization pressure for percarbonate is lowered and on the other hand the excess of mother liquor increases.

In the process there are added the customary active oxygen stabilizers such as magnesium salts, alkali salts, preferably magnesium sulfate and water glass (sodium silicate). Other stabilizers include for example magnesium silicate, magnesium chloride. The stabilizer can be used for example in an amount of 3 to 8 grams $MgSO_4$ . 7 $H_2O$ pro liter solution. The addition of active oxygen stabilizers serves to stabilize the finished products and the solutions which are being added.

The filtered soda solution as stated, can be produced with fresh reagents as well as by using the mother liquor resulting after filtering off the percarbonate.

It is favorable in using water glass and reuse of the mother liquor saturated in sodium percarbonate which still contains a part of the stabilizers of the previous reaction to make up the necessary amount of water glass before addition of the calcined soda, since then the impurities in the mother liquor are adsorbed by precipitation of magnesium silicate. During the addition of calcined soda basic magnesium carbonate precipitates out, which together with magnesium silicate adsorbs the impurities from the industrial soda. Thereby, there is likewise reduced the loss of active oxygen.

Simultaneously, the magnesium concentration is reduced; the filtered or decanted soda containing addition solution is saturated in magnesium silicate and basic magnesium carbonate. The magnesium concentration therefore only varies a trifling amount in this solution.

The increase and decrease of the supersaturation takes place with stirring. It is known that the speed of formation of seeds is dependent upon the speed of stirring. With quicker stirring there is a too quick reduction of the supersaturation and a too fine product precipitates out. With too slow stirring on the contrary the breakdown is incomplete. If the mother liquor from such a reaction is used in the preparation of a filtered or decanted soda addition solution, then sodium percarbonate crystallizes out during the production of this addition solution since the more readily soluble soda forces the more difficultly soluble sodium percarbonate out of the solution. This sodium percarbonate then precipitates together with the impurities and the magnesium compounds and is lost.

In order to establish optimum stirring speed directly after addition of the hydrogen peroxide the amount of supersaturation of the sodium percarbonate present is ascertained and its breakdown determined.

The stirring speed selected is lastly established by the sodium percarbonate quality obtained, i.e., the coarse, compact particle. If the reduction of the supersaturation is too quick then the stirring speed must be lowered and conversely if the reduction in supersaturation is too slow the stirring speed must be increased until the desired breakdown speed has been established.

In measuring the amount of mother liquor which is fed in into the preliminary inocculant per unit of time it must be sufficient together with the aqueous part of the preliminary inocculant to bring the calcined soda fed in into solution. If the dilution by the mother liquor is too great, the crystallization pressure is decreased and is reversed. At too high crystallization pressure there is formed a fine product, in the reversed case the breakdown of the supersaturation is incomplete.

Finally, the dilution chosen is determined by the quality of the salt to be obtained.

The amount of calcined soda fed in must be sufficiently large that in the presence of the other components, including the sodium hexametaphosphate, there can be formed in the preliminary inocculant a percarbonate supersaturation which can be broken down again. However, it must not be so large that sodium carbonate decahydrate is present as a solid phase.

In using the mother liquor there is preferably added a mother liquor whose active oxygen to sodium ratio is about 0.6 to 0.8:1. This is a ratio which particularly frequently occurs in the practice of the process of the invention, it is regarded as of fluctuating width.

The precipitating sodium percarbonate is filtered off and dried in known manner. The process can be carried out without modification in customary plants for the production of sodium perborate.

The industrial advantage of the process is in the reuse of the mother liquor at substantial constancy of the precipitation parameters such as the composition of the soda addition solution, an about constant degree of impurities and temperature. As a result after each reaction there is obtained a qualitative unity, i.e., large, compact product. New percarbonate crystallizes on the inocculant seeds present, see the drawings.

The process can comprise, consist essentially of or consist of the steps set forth with the materials described.

DESCRIPTION OF THE DRAWINGS

The single FIGURE of the drawings is a slanted light photographic enlargement (25 times) showing how new percarbonate crystallizes on the inocculant seeds present.

DESCRIPTION OF THE PREFERRED EMBODIMENTS

The invention is further explained in the following examples.

In the Examples, the following abbreviations are used:
NaPc = sodium percarbonate
Hexa = sodium hexametaphosphate
ML = mother liquor
Oa = active oxygen
g—At/l = gram atoms/l

EXAMPLES

1. Production of the Soda Containing Addition Solution 1.35 grams of Hexa were first dissolved in 1 liter of NaPc spent liquor at 15° C. which contains 200 grams NaCl, 72.2 grams $Na_2CO_3$. 1.5 $H_2O_2$, 4.5 grams $MgSO_4$. $7H_2O$ and 0.15 gram sodium hexametaphosphate. At constant temperature and with stirring there were dosed into the above spent liquor within 15 minutes via an AEG-trough 150 grams of technical soda (88%). The insoluble constituents were removed by filtration and a clear soda containing insert solution obtained having the following analytical data:
Oa (active oxygen) = 0.69 g—At/l
Na (total sodium) = 2.80 g—At/l
Oa/Na - proportions = 0.24

1.1 Reaction of Filtered Soda Solution With About 70 Weight % $H_2O_2$

There was present in an open coil cooled glass vessel (diameter = 13.5 cm, height = 21 cm) 1 liter of NaPc suspension containing 150 grams NaPc solid per liter of ML which contained per liter 200 grams NaCl, 75 grams $Na_2CO_3$. 1.5 $H_2O_2$, 5 grams $MgSO_4$. $7H_2O$ and 0.15 gram Hexa with stirring at 15° C. (stirrer propeller diameter 5 cm, stirring speed = 500 rpm).

In this preliminary mix at constant temperature there were fed in simultaneously and continuously 2 liters of soda containing addition solution/h (Na = 2.84 gram atoms/l, Oa = 0.57 g—At/l, Hexa = 0.35 gram/l) produced as described in Example 1, and 126.6 ml of $H_2O_2$/h (24.5 moles/l, 72.7 grams NaCl/l and 57.6 grams $MgSO_4$. $7H_2O$/l).

Periodically sufficient NaPc suspension was withdrawn from the crystallization vessel that there occurred a maximum variation in volume of ±15%. After 30 minutes post reaction time the salt was separated over a suction filter and air dried.

Salt Analysis
Oa = 14.56%
Bulk density = 860 grams/l
Sieve analysis
  on 0.8 mm = 0%
  on 0.5 mm = 20%
  on 0.4 mm = 31%
  on 0.2 mm = 49%
  on 0.1 mm = 0%
  Residue = 0%

1.2 Reaction of the Soda Solution Formed in the Reaction Mixture With About 70 Weight % $H_2O_2$ In the preliminary mix described in Example 1.1 there were fed in at 15° C. simultaneously and continuously per hour 300 grams of calcined soda (74%), 2 liters of mother liquor (Na = 0.94 g—At/l, Oa = 0.68 g—At/l, 200 grams NaCl/l, 5 grams $MgSO_4$. $7H_2O$/l, 0.4 gram Hexa/l, 1.5 ml water glass 38° Baume/l) and 126.4 ml of $H_2O_2$ (24.5 moles/l, 72.7 grams NaCl/l and 57.6 grams $MgSO_4$. $7H_2O$/l).

The salt suspension was periodically withdrawn from the crystallization vessel, separated over a suction filter and air dried.

Salt Analysis
Active oxygen = 14.02%
Bulk density = 860 grams/l
Sieve analysis
  on 0.8 mm = 0%
  on 0.5 mm = 12%
  on 0.4 mm = 13%
  on 0.2 mm = 61%
  on 0.1 mm = 13%
  Residue = 1%

1.3 Working Test

There were present in an open stirrer crystallizer (diameter 1,530 mm, height 1,420 mm) 1 cubic meter of NaPc suspension having 150 grams of NaPc solid per liter of ML which contained in a liter 200 grams NaCl, 75 grams $Na_2CO_3$. 1.5 $H_2O_2$, 5 grams $MgSO_4$. $7H_2O$ and 0.15 gram Hexa and the mixture stirred at 15° C. (stirrer propeller diameter = 500 mm, stirring speed 220 rpm).

There were fed at constant temperature via a Rotameter into this preliminary mixture simultaneously and continuously per hour 300 kg of calcined soda (98%), 2 cubic meters of mother liquor (Na = 0.92 g—At/l, Oa = 0.66 g—At/l, 200 grams NaCl/l, 5 grams $MgSO_4$. $7H_2O$/l, 0.6 gram Hexa/l and 1.5 ml of water glass 38° Baume/l) and 143 liters of $H_2O_2$ (24.5 moles/l, 72/7 grams NaCl/l and 57.6 grams $MgSO_4$. $7H_2O$/l).

The salt suspension was continuously withdrawn from the crystallization vessel into an intermediate container, after a residence time of 30 minutes separated with a centrifuge and dried in a fluidized bed.
Active Oxygen = 14.10%
Bulk density = 860 grams/l
Sieve analysis on 0.8 mm = 0%
on 0.5 mm = 20%
on 0.4 mm = 31%
on 0.2 mm = 49%
on 0.1 mm = 0%
Residue = 0%

What is claimed is:

1. A continuous process for the production of a compact, coarse abrasion resistant sodium percarbonate by reaction of sodium carbonate and hydrogen peroxide in the presence of sodium percarbonate inocculant seeds, sodium chloride, known active oxygen stabilizers and sodium hexametaphosphate at 10°–20° C., said process comprising feeding into the preliminary inocculant an aqueous hydrogen peroxide solution containing an active oxygen stabilizer and simultaneously either (1) a filtered solution saturated in sodium carbonate and containing 40-100 grams per liter of sodium percarbonate, 0.1-1.0 gram of sodium hexametaphosphate per liter, 100-200 grams of sodium chloride per liter and an active oxygen stabilizer or (2) a mother liquor containing 40-100 grams of sodium percarbonate per liter, 0.1-1.0 gram of sodium hexametaphosphate per liter, 100-200 grams of sodium chloride per liter of solution and an active oxygen stabilizer, with the proviso that when the mother liquor is employed there is also fed into the preliminary inocculant such an amount of calcined soda that no sodium carbonate decahydrate forms as a solid phase in the preliminary inocculant, the amount of hydrogen peroxide added being approximately equivalent to the amount of dissolved sodium carbonate for reaction, while maintaining the same temperature during the entire process of precipitating sodium percarbonate, the supersaturation initially formed upon addition of the hydrogen peroxide being reduced by the precipitation of the sodium percarbonate, separating the precipitated sodium percarbonate, drying the separated sodium percarbonate and returning the resulting mother liquor after separation of the precipitated sodium percarbonate again into the first step of the process.

2. The process according to claim 1 wherein there is employed 0.2-0.6 gram of sodium hexametaphosphate per liter of filtered solution in procedure (1) or per liter of mother liquor in procedure (2).

3. The process according to claim 2 wherein the chosen precipitation temperature is not varied by more than about ±1° C.

4. The process according to claim 3 wherein there is used a mother liquor having a ratio of active oxygen to sodium of from 0.60 to 0.80:1.

5. The process according to claim 1 wherein there is used a mother liquor having a ratio of active oxygen to sodium of from 0.60 to 0.80:1.

6. The process according to claim 1 wherein the precipitation temperature selected is not varied by more than about ±1° C.

7. The process of claim 1 wherein not over 1% of the sodium percarbonate formed passes through a 0.1 mm sieve.

8. The process of claim 7 wherein not over 0% of the sodium percarbonate formed is retained in a 0.8 mm sieve.

* * * * *